Dec. 19, 1961 L. B. READ 3,013,576
PRESSURE REGULATOR
Filed Aug. 29, 1958 2 Sheets-Sheet 1

INVENTOR.
LELAND B. READ
BY
Laurence M. Goodridge
ATTORNEY

INVENTOR.
LELAND B. READ
BY
Laurence M. Goodridge
ATTORNEY

United States Patent Office 3,013,576
Patented Dec. 19, 1961

3,013,576
PRESSURE REGULATOR
Leland B. Read, Florissant, Mo., assignor to ACF Industries, Incorporated, New York, N.Y., a corporation of New Jersey
Filed Aug. 29, 1958, Ser. No. 758,092
3 Claims. (Cl. 137—446)

This invention relates to carburetors, and more specifically to pressure regulating devices for carburetors which control the fuel head pressure supply to the carburetor metering mechanism.

Those skilled in this art will readily understand the invention inasmuch as it will be appreciated by them that uniform fuel metering depends upon a uniform control of the pressure drop across a fuel metering restriction in the carburetor.

Thus, in the ordinary type of engine aspirated carburetor, the pressure downstream of the fuel metering restriction is generally venturi throat pressure, and, consequently, a direct function of the rate of air flow to the engine through the venturi, and uniform fuel flow requires a precise control of the fuel head pressure supply to these fuel metering restrictions—in other words, the upstream pressure head. Since the fuel is supplied to a carburetor from a pump with a fluctuating output pressure, it is necessary to establish the upstream pressure head by a pressure regulator. This device can take any one of several forms. The most common of these forms is a fuel bowl with a constant level mechanism or float in a fuel bowl or chamber, and needle valve mechanism at the bowl or fuel chamber inlet, or it can be a diaphragm in a chamber for operating a needle at the chamber fuel inlet. This invention is applicable to either of these common forms of pressure regulators, but obviously not restricted thereto.

This description will be limited to one form alone (the float and needle valve mechanism) for a constant level fuel bowl regulator, but it is pointed out that the following explanation and description applies to all forms of regulators.

Thus, it can be stated that in all forms the needle valve closing force for shutting off the inlet of fuel to the bowl or chamber is limited by overall limits in the size of the carburetor itself. Only so large a float or so large a diaphragm is permitted. Likewise, the inlet valve can only be so small because its flow capacity must exceed the maximum fuel requirements of the engine. Where these requirements are large for large engines, it has been accepted practice to use two fuel inlets and two regulators.

It will be readily apparent, therefore, that for practical considerations certain limits on these relative sizes of the parts cannot be exceeded or reduced, as the case may be, and it is important to realize that the relative size of these parts (float and inlet valve, for example) have a definite bearing on regulator efficiency. Obviously, the fuel pump pressure acting on the needle valve opposes the closing force of the float mechanism, and therefore fuel pump pressure fluctuations effect changes in upstream fuel pressure head, since an increase in needle closing force cannot be obtained without increase in float displacement. This is an inherent disadvantage of most regulators, especially of the kind heretofore mentioned. Some slight changes in upstream pressure head will not upset the fuel metering in the carburetor, and can be tolerated or compensated, but, if there must be fluctuations, at least the same should be as small as possible while still maintaining the mechanism of the regulator as inexpensive and simple as possible.

One of the objects of this invention is a regulator which is small, compact, and inexpensive.

Another object of this invention is a regulator for minimizing fuel pressure head variations with fluctuating pump pressures.

Another object of this invention is to provide a lever mechanism for the regulator which applies an increasing force on the fuel inlet valve during final valve closing range of movement.

Another object of this invention is to provide a mechanism with close control at small fuel inlet valve openings.

Another object of this invention is to provide a mechanism with increasing flow capacity at increased inlet valve openings to thus minimize drop in fuel pressure head.

According to this invention, a lever mechanism for the regulator provides very close control of fuel inlet valve positions in the final range of closing movement of the valve in response to relatively large movements of the means operating the lever mechanism in response to changes in fuel pressure head.

Expressed another way, the lever mechanism is so arranged and constructed that the closing force imposed upon the fuel inlet needle valve increases rapidly as the valve closes, although the force imposed upon the lever mechanism by changes in fuel pressure head remains substantially constant.

A more complete understanding of the operational advantages of this invention will be had from the following detailed description taken with the accompanying drawings which show one modification thereof, and in which.

In the following detailed description, like reference characters will be used to indicate like parts.

It will be understood from the following detailed description that this invention is applicable to any type of carburetor requiring a regulator mechanism for controlling the head of fuel pressure upstream of the carburetor metering devices. For purposes of illustration, a single-barrel carburetor is shown of the downdraft type, but it will be readily recognized by those skilled in the art that the type of carburetor has little to do with the invention, and is merely disclosed and described here to lay the groundwork for a more complete understanding of the instant invention.

Figure 1:
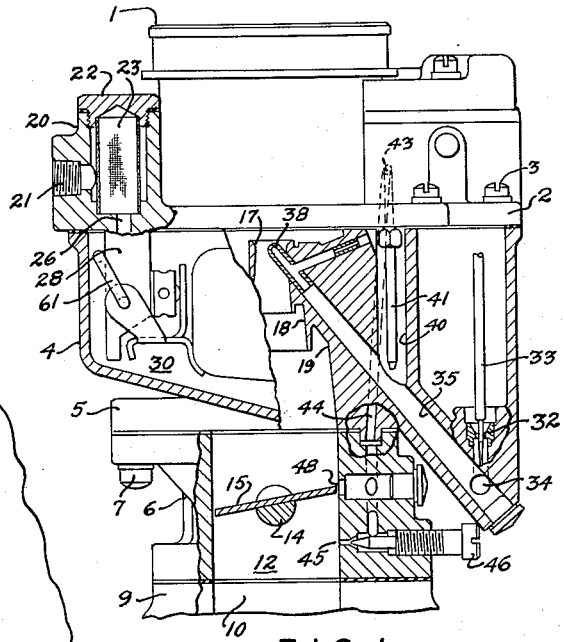
FIG. 1 is a side elevation of a carburetor with parts broken away and in section to illustrate the environment of the invention.

For example, in FIG. 1 is shown a carburetor having an air horn 1 which includes a float bowl cover 2 secured by certain screws 3 to the carburetor body 4. Flanges 5 on the carburetor body are, in turn, secured to a throttle body 6 by screws 7. Below the throttle body is the usual intake manifold 9 having an induction passage 10 which registers with the mixture conduit 12 in the throttle body 6. The throttle body, in turn, is mounted on the intake manifold 9 and secured in place thereon by the usual studs (not shown). Within the mixture conduit 12 is a throttle shaft 14 carrying a throttle valve 15. A suitable manual or other control may be provided for operation of the shaft 14, and thereby control the amount of mixture passing the throttle to the engine. Above the throttle valve are a series of venturi 17, 18 and 19 arranged in the usual manner so that the air flow through the primary venturi 17 is aspirated by the flow through the other venturi 18 and 19, all in a well understood manner.

Cast integrally with the bowl cover 2 is a fuel standpipe 20 having an inlet connection 21. A cap 22 closes the upper end of the hollow standpipe 20 and supports a filter screen 23 through which the fuel must pass to a bowl inlet connection 26. This connection 26 is in the form of a passage contained within a bracket 28 depending from and formed integral with the bowl cover 2. The bracket 28 extends downwardly into a fuel bowl 30 which contains the regulator mechanism hereinafter described. This mechanism, in turn, controls the pressure head of fuel within the bowl 30 to maintain this head substantially constant. In the bottom of the bowl 30 is a metering orifice 32 controlled by a rod 33 operated from the throttle shaft 14 or by an economizer piston (not shown here), all as well known in the art. Orifice jet 32 controls the flow of fuel into a main fuel passage 35 through the connection 34, which main fuel passage 35 extends to the fuel nozzle 38 in the primary venturi 17.

Connecting with the main fuel passage 35 is a fuel well 40 containing the idle metering tube 41 which, in turn, is interconnected by a succession of passages such as 43, 44 with an idle port 45 controlled by an idle adjusting screw 46. Adjacent the edge of the throttle 15 is a fuel port 48 supplied from the idle system.

For the purposes of this invention, the head of fuel pressure in the fuel bowl 30 is referred to as the pressure upstream of the fuel metering restrictions 32 and 41, and the pressure in the venturi throat 17 and at the ports 45 and 48 is referred to as the downstream pressure.

Carburetor metering, of course, is based upon variable downstream pressure in the carburetor, which produces a proportional flow of gasoline to air, since the pressure drop at the throat of venturi 17 is substantially a measure of the rate of air flow to the engine. Therefore, uniform metering will depend to a great extent upon the fact that fuel pressure upstream of the fuel metering restrictions 32 and 41 bears a constant relation to air pressure upstream of the venturi 17. By means of inside vents or the like, the air pressure in the fuel bowl is maintained equal to the air pressure in the air horn upstream of the venturi 17, but the total pressure head on the metering restrictions 32, 41, 43, etc., is not only a function of this pressure, but also depends upon a constant pressure head of fuel in the fuel bowl. It is the function of a regulator to maintain this fuel pressure head in the bowl substantially constant and, in the present instance, the regulator is a float and needle valve mechanism, it being well understood that the same effect can be obtained with a diaphragm and needle valve regulator.

Figure 3:
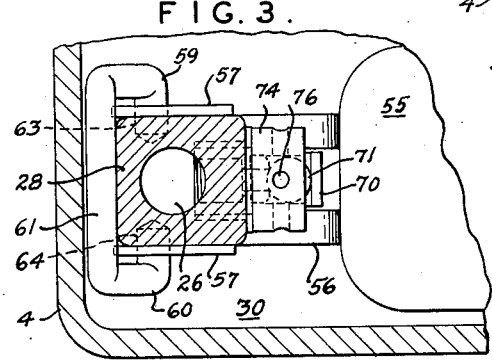
FIG. 3 is a top view of the regulator mechanism of this invention.
Figure 2:
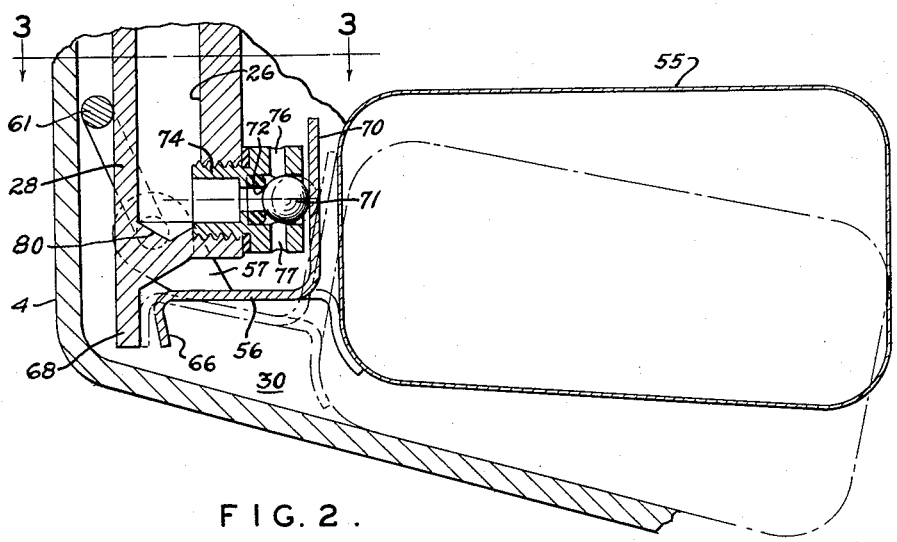
FIG. 2 is a side elevation in section of a fuel bowl on an enlarged scale containing a regulator constructed in accordance with this invention.

Turning now to the regulator used in the carburetor shown in FIGS. 1, 2 and 3, this regulator has a float such as 55 within the fuel bowl 30. The float 55 is mounted on an arm of a lever mechanism such as 56 having spaced apertured ears such as 57 journaled on the split shaft 59 and 60 of a U-shaped clip 61. As will be seen in FIG. 3, the ends 59 and 60 forming the journals for hinging the float lever mechanism are, in turn, received within sockets 63 and 64, respectively, of the bracket 28. A depending leg such as 66 of float lever 56 abuts a lug 68 or bracket 28 for limiting the downward pivoting movement of the float 55.

A valve operating lever 70 extends upwardly from the lever mechanism 56 to operate a ball valve (in this case) 71 on a rubber valve seat 72 at the outlet of passage 26 which supplies fuel to the fuel bowl 30. The rubber seat 72 is, in turn, formed within a fitting 74 threaded into the bracket 28, and has outlet passages 76 and 77 opening into the bowl 30. The pivotal axis 80 of the float lever mechanism 56 may be generally described as offset from the axis of the valve seat 72. The amount of offset of axis 80 contributes materially to the effect produced by the raising and lowering of the float 55 upon the position of the inlet valve 71. In this case, the distance between the axis 80 and the valve operating lever 70 is approximately three times the amount of offset of the axis 80 from the center line through the valve seat 72.

This offset relation above described produces an increase in the mechanical advantage of the float operated lever mechanism as the float 55 moves upwardly in the bowl; or, in other words, it increases the closing force imposed on the inlet valve 71 as the float 55 raises, without any substantial change in the amount of fluid displaced by the float 55, which, in turn, means without any substantial increase in the force on the lever mechanism produced by the float to minimize changes in fuel level. Looking at the problem from the opposite point of view, the more the float 55 drops in response to decreases in fuel level, the greater the valve opening produced by float movement. Float movement and valve movement are not related as a constant ratio, one to the other.

The above described regulator is responsive to changes in fuel pressure head within the bowl 30 to open and close the inlet valve 71, and the ratio of valve movement to float movement is such that, as the valve approaches closed position, the valve operating lever 70 is operative to wedgingly engage the valve 71 to press it against its seat. The above described relationship of the pivotal axis 80 for the lever mechanism is such that there is no substantial sticking between valve lever 70 and the valve in tightly closed position, in spite of the fact that the valve operating lever 70 is operating on an arc with respect to the axis of the valve seat 72, so that there is some sliding action between the surface of the valve operating lever 70 and the inlet valve 71. As a matter of fact, the use of a ball type inlet valve 71 permits a closer relationship of the pivotal axis 80 of the valve operating lever mechanism and the axis of the valve seat 72. It will readily be recognized that if the two coincided, the wedging action might stick the float in its raised position because of the friction between the valve operating lever and the surface of the inlet valve 71. The present lever mechanism therefore provides for a very fine adjustment of the inlet valve 71 in the final range of closing action of the valve 71, and this closing action is not subject to any sticking between the parts which would upset the fuel regulation.

On the other hand, the lever mechanism is so arranged that increasing valve openings are effected on float movement in the downward direction. This will, of course, have the advantage of reducing the pressure head variation within the fuel bowl 30.

Figure 4:
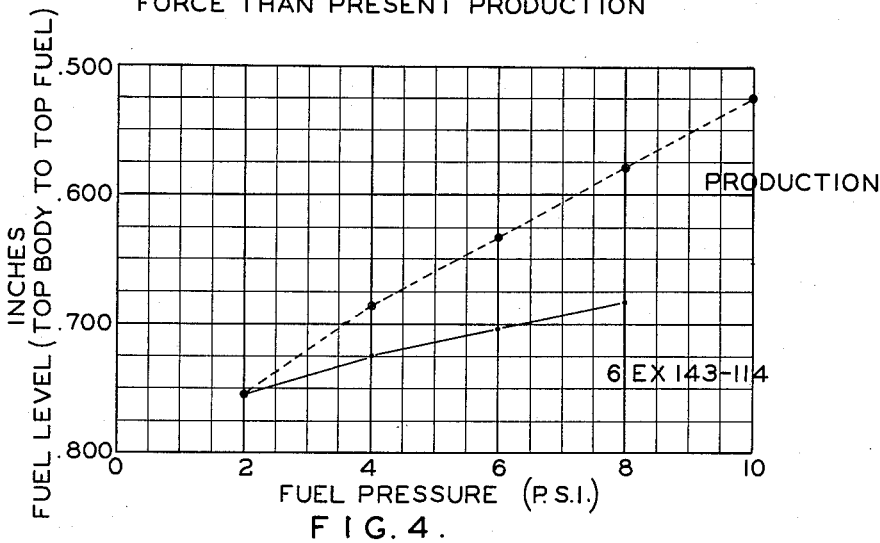
FIGS. 4 and 5 are charts illustrating the result of testing comparative forms of pressure regulators.

This invention can be better appreciated by reference to FIG. 4 wherein is plotted the variations in fuel level against variations in fuel pump pressure in pounds per square inch for the production type of needle valve seat and the experimental type of inlet valve and float lever mechanism as disclosed herein (designated in tests as 6EX143-114). It will be noted by reference to the curves shown thereon that an eight pound pressure variation from the pump can result in a fuel level change of over two and a half tenths of an inch for the production type, whereas, for the present valve construction, this same pressure range produces only about one tenth of an inch in fuel level change. All other things being equal, then, without additional expense, it is possible to obtain much closer regulation with the instant invention than is possible with the present production type, and this improvement amounts to a substantial amount, approximately one hundred fifty percent better.

Figure 5:
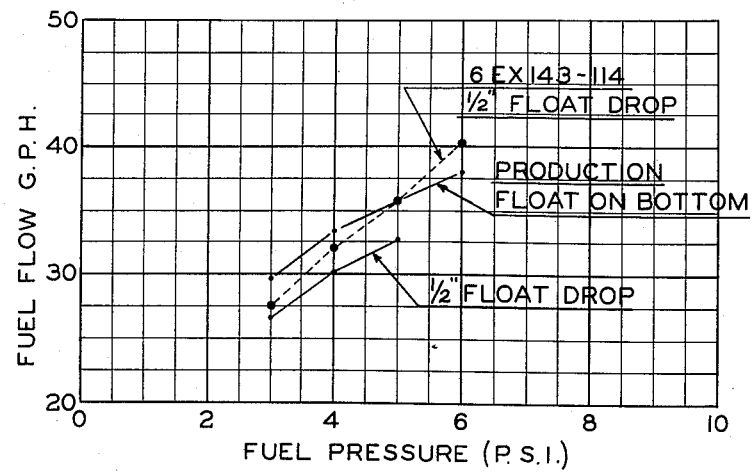

Turning now to FIG. 5, these curves are for a production type of float and needle and the float and valve mechanism shown in the instant invention indicating the results obtained by plotting a fuel flow in gallons per hour against fuel pressure from the pump. These curves indicate that the flow through the inlet valve in the instant invention for one-half inch float drop is greater at all pressures than that now produced by the production type of needle valve and seat, and that, at the higher pump pressures, the flow capacity of this invention is equal to or better than the flow capacity of the conventional production needle valve and seat wide open with the float on the bottom. Thus, a comparison between the curves for one-half inch float drop quite clearly indicates the fact that the amount of opening produced by this invention increases very rapidly as the float is lowered, so that it can be stated that not only does this invention produce closer control at small valve openings, but also reduces excessive amounts of float drop, and that the range of operation of this invention would be confined to smaller amounts of float movement.

A structure has been described which will fulfill all of the objects of the present invention, but it will be readily apparent that other modifications will occur to those skilled in the art which come within the scope of the appended claims.

I claim:

1. A fuel pressure head regulator for a carburetor comprising a fuel chamber, a pipe structure having a passage therein forming a fuel inlet for connection with a source of fluid under pressure, a fuel inlet passage connecting said fuel inlet with said fuel chamber, said pipe structure including a depending lug positoned outwardly of said fuel inlet passage, a valve seat formed within said fuel inlet passage, a ball valve structure positioned in said fuel passage for movement toward and away from said valve seat to open and close said fuel inlet passage to permit the discharge of fuel into said fuel chamber, a guide for said movable ball valve formed in said fuel inlet passage, and an operating mechanism for said valve, said operating mechanism including a bracket, said bracket including a first ball valve actuating arm, a medial portion and a second arm for movement towards and away from said lug, said intermediate portion being provided with spaced apertured ears positioned at each side of said fuel inlet pipe structure, pivot pin members extending through said ears into said pipe structure outwardly of said ball valve and spaced from the axis of said valve seat for pivotally supporting said arms and said bracket, and a float positioned in said fuel chamber and connected to said bracket at the junction of said medial portion and said first actuating arm for actuating said bracket on its pivot to urge said first actuating arm into engagement with said ball valve to move the latter toward its seat to control the flow of fuel through said fuel inlet passage in accordance with the fuel level in said fuel chamber.

2. A fuel pressure head regulator for a carburetor comprising a fuel chamber, a pipe structure having a passage therein forming a fuel inlet for connection with a source of fluid under pressure, a fuel inlet passage connecting said fuel inlet with said fuel chamber, said pipe structure including a depending lug positioned outwardly of said fuel inlet passage, a valve seat formed within said fuel inlet passage, a ball valve structure positioned in said fuel passage for movement toward and away from said valve seat to open and close said fuel inlet passage to permit the discharge of fuel into said fuel chamber, a guide for said movable ball valve formed in said fuel inlet passage, and an operating mechanism for said valve, said operating mechanism including a bracket, said bracket including a first ball valve actuating arm, a medial portion and a second arm adjacent to said lug for movement towards and away from said lug, said intermediate bracket portion being provided with spaced apertured ears positioned one at each side of said fuel inlet pipe structure, pivot pin members extending through said ears and into said pipe structure for pivotally supporting said arms and bracket, and a float positioned in said fuel chamber and connected to said bracket at the junction of said medial portion and said first actuating arm to urge said first actuating arm into engagement with said ball valve to move the latter toward its seat to control the flow of fuel through said fuel inlet passage in accordance with the fuel level in said fuel chamber.

3. The structure of claim 2 characterized in that said pivot pin members comprise inturned portions of a U-shaped clip which partially embraces the pipe structure.

References Cited in the file of this patent

UNITED STATES PATENTS

| | | |
|---|---|---|
| 463,286 | Cone | Nov. 17, 1891 |
| 662,837 | Valiquette | Nov. 27, 1900 |
| 691,444 | Cecil | Jan. 21, 1902 |
| 1,226,139 | Slebbins | May 15, 1917 |
| 1,494,786 | Kauale | Mar. 20, 1924 |
| 1,563,339 | Chandler | Dec. 1, 1925 |

FOREIGN PATENTS

| | | |
|---|---|---|
| 129,245 | Austria | July 25, 1932 |
| 193,322 | Austria | Nov. 25, 1957 |